US011629957B2

(12) United States Patent
Sasaki

(10) Patent No.: US 11,629,957 B2
(45) Date of Patent: Apr. 18, 2023

(54) SURVEYING APPARATUS

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 185 days.

(21) Appl. No.: 16/916,183

(22) Filed: Jun. 30, 2020

(65) Prior Publication Data

US 2021/0018318 A1  Jan. 21, 2021

(30) Foreign Application Priority Data

Jul. 16, 2019 (JP) .............................. JP2019-130996

(51) Int. Cl.
*G01C 15/00* (2006.01)
*G02B 23/12* (2006.01)
*G02B 26/10* (2006.01)

(52) U.S. Cl.
CPC ........... *G01C 15/002* (2013.01); *G02B 23/12* (2013.01); *G02B 26/10* (2013.01)

(58) Field of Classification Search
CPC .. G01B 11/24; H04N 5/23229; G01C 15/002; G01C 15/02; G02B 23/12; G02B 26/10
See application file for complete search history.

(56) References Cited

U.S. PATENT DOCUMENTS 7,861,423 B2 * 1/2011 Kumagai ............. G01C 15/004
                                                    33/290
7,969,558 B2   6/2011 Hall 8,064,046 B2 * 11/2011 Ossig ................... G01S 7/4911
                                                    356/5.01
8,767,190 B2   7/2014 Hall
(Continued)

FOREIGN PATENT DOCUMENTS

CN    108362216 A  *  8/2018 ............. G01B 11/16
CN    108362216 A     8/2018
(Continued)

OTHER PUBLICATIONS ip.com Search History (Year: 2022).*
(Continued)

*Primary Examiner* — Roy M Punnoose
(74) *Attorney, Agent, or Firm* — Chiesa, Shahinian & Giantomasi PC

(57) ABSTRACT

A surveying apparatus has a combined structure of a total station and a laser scanner. The surveying apparatus includes a point cloud data acquiring unit, an abnormal part detecting unit, an abnormal part position acquiring unit, and an automatic sighting controller. The point cloud data acquiring unit acquires first point cloud data and second point cloud data obtained by laser scanning that is performed on an object to be inspected at a time interval. The abnormal part detecting unit calculates a difference between the first and second point cloud data to detect a part of the object to be inspected, at which position information varies, as a detailed-inspection target part. The abnormal part position acquiring unit acquires a position of the detailed-inspection target part. The automatic sighting controller controls to make the total station sight the detailed-inspection target part, based on the position of the detailed-inspection target part.

5 Claims, 8 Drawing Sheets

(56) References Cited

U.S. PATENT DOCUMENTS

| | | | |
|---|---|---|---|
| 10,546,373 B2* | 1/2020 | Trenholm | G01S 17/87 |
| 2009/0235541 A1 | 9/2009 | Kumagai et al. | |
| 2009/0241358 A1* | 10/2009 | Ohtomo | G01C 15/002 |
| | | | 33/275 R |
| 2010/0256940 A1 | 10/2010 | Ogawa et al. | |
| 2012/0242830 A1* | 9/2012 | Kumagai | G01C 15/002 |
| | | | 348/135 |
| 2014/0037194 A1 | 2/2014 | Kitamura et al. | |
| 2014/0063489 A1* | 3/2014 | Steffey | G01B 11/24 |
| | | | 356/72 |
| 2015/0206023 A1* | 7/2015 | Kochi | G01B 11/00 |
| | | | 382/199 |
| 2015/0293224 A1 | 10/2015 | Eldada et al. | |
| 2015/0362310 A1* | 12/2015 | Taniguchi | G05B 19/401 |
| | | | 356/4.01 |
| 2017/0004345 A1 | 1/2017 | Sasaki et al. | |
| 2017/0269197 A1 | 9/2017 | Hall et al. | |
| 2017/0363421 A1* | 12/2017 | Kumagai | G01S 17/08 |
| 2018/0003493 A1* | 1/2018 | Bernhard | G01C 5/00 |
| 2018/0040119 A1* | 2/2018 | Trenholm | G06T 7/41 |
| 2019/0145769 A1* | 5/2019 | Sasaki | G01S 7/4817 |
| | | | 356/4.01 |
| 2019/0170865 A1* | 6/2019 | Sasaki | G01C 25/00 |
| 2021/0033394 A1* | 2/2021 | Sasaki | G01C 3/06 |

FOREIGN PATENT DOCUMENTS

| | | | | |
|---|---|---|---|---|
| CN | 108974044 A | | 12/2018 | |
| CN | 108362216 B | * | 5/2020 | ............. G01B 11/16 |
| EP | 3258212 A1 | * | 12/2017 | ............. G01C 1/02 |
| EP | 3483554 A1 | | 5/2019 | |
| JP | 2008-107175 A | | 5/2008 | |
| JP | 2008-268004 A | | 11/2008 | |
| JP | 2009-229192 A | | 10/2009 | |
| JP | 2010-151682 A | | 7/2010 | |
| JP | 2012-202821 A | | 10/2012 | |
| JP | 5124319 B2 | | 1/2013 | |
| JP | 2014-035702 A | | 2/2014 | |
| JP | 2015-046128 A | | 3/2015 | |
| JP | 2017-015598 A | | 1/2017 | |
| WO | 2012/141235 A1 | | 10/2012 | |
| WO | 2018216629 A1 | | 11/2018 | |

OTHER PUBLICATIONS

Extended European Search Report dated Nov. 27, 2020, in connection with European Patent Application No. 20184246.5, 8 pgs.
National Institute for Land and Infrastructure Management of the Ministry of Land, Infrastructure, Transport and Tourism, "Technical Notes of the National Institute for Land and Infrastructure Management No. 748," retrieved from http://www.nilim.go.jp/lab/beg/siryou/tnn/tnn0748.htm on Jun. 18, 2020, 2 pgs.

* cited by examiner

SURVEYING APPARATUS

CROSS REFERENCE TO RELATED APPLICATIONS

This application claims priority from Japanese Patent Application No. 2019-130996, filed Jul. 16, 2019, the disclosure of which is incorporated herein by reference in its entirety.

FIELD

The present invention relates to a technique for detecting abnormality of a target object.

BACKGROUND

A bridge pier, a slope reinforced with concrete, and the like, should be regularly inspected in order to inspect for abnormalities. Herein, "abnormality" is a condition in which deformation, defect, crack, embrittlement, or other undesirable phenomenon occurs. For example, Japanese Unexamined Patent Application Laid-Open No. 2008-107175 discloses a technique for detecting ground deformation by means of 3D measurement using a laser scanner.

Normally, after an abnormality of a target object is detected by using a laser scanner, an inspector visually inspects the abnormal part or photographs the abnormal part so as to perform precise inspection that uses the photographic image. It is desirable to perform the work for detecting and confirming the abnormal part with high efficiency.

SUMMARY

An object of the present invention is to increase efficiency of work relating to detection of abnormal parts of a target object by means of laser scanning.

The present invention provides a surveying apparatus having a combined structure of a total station and a laser scanner. Relationships of exterior orientation parameters between the total station and the laser scanner are known in advance. The surveying apparatus includes a point cloud data acquiring unit, a detecting unit, a position acquiring unit, and a sighting controller. The point cloud data acquiring unit acquires first point cloud data and second point cloud data that are obtained by laser scanning. The laser scanning is performed on an object to be inspected at a time interval by the laser scanner. The detecting unit calculates a difference between the first point cloud data and the second point cloud data to detect a part at which position information varies of the object to be inspected, as a detailed-inspection target part. The position acquiring unit acquires a position of the detailed-inspection target part. The sighting controller controls to make the total station sight the detailed-inspection target part, on the basis of the position of the detailed-inspection target part.

In the present invention, the total station preferably includes a telescope and an imaging unit that images an image captured by the telescope, the control for sighting preferably makes the telescope sight the detailed-inspection target part, and the imaging unit preferably images an enlarged image of the detailed-inspection target part. In addition, in the present invention, the total station preferably has a function of emitting marking light, and the marking light is preferably emitted to the detailed-inspection target part after the control for sighting is performed. Moreover, in the present invention, the total station preferably performs positioning on multiple points at the detailed-inspection target part after the control for sighting is performed. Furthermore, in the present invention, a pattern type of abnormality is preferably determined on the basis of the difference between the first point cloud data and the second point cloud data. In this case, post processing is preferably determined in accordance with the determined pattern type of abnormality.

The present invention enables increasing efficiency of work relating to detection of abnormal parts of a target object by means of laser scanning.

DETAILED DESCRIPTION

1. First Embodiment

Overview

Figure 1A:
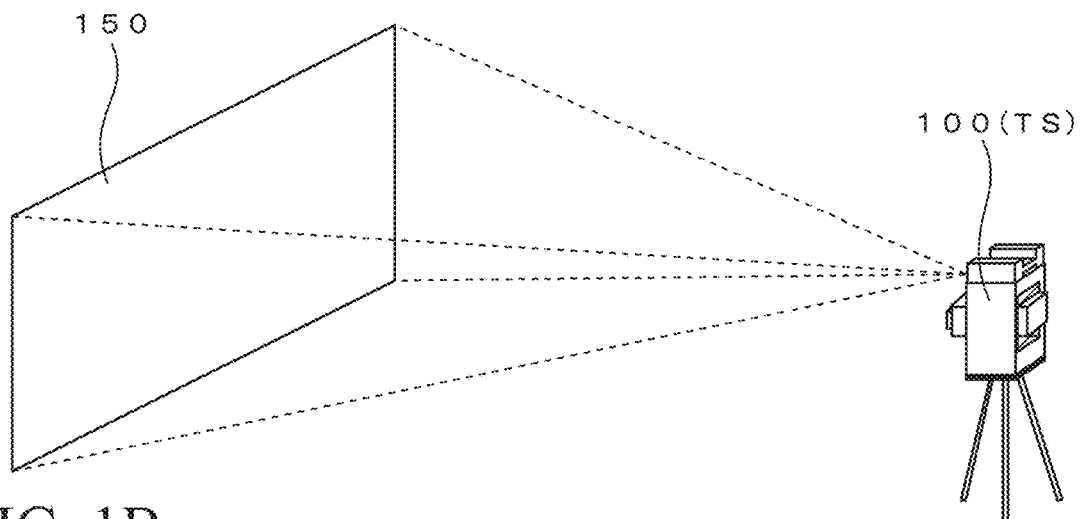
FIGS. 1A to 1C are principle diagrams showing a principle of detection of an abnormal part.
Figure 1B:
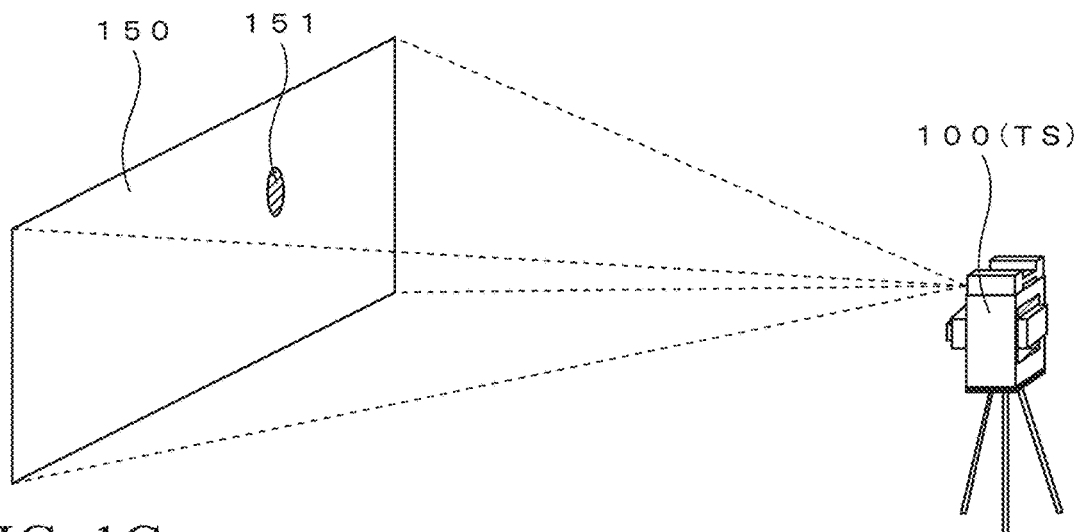
Figure 1C:
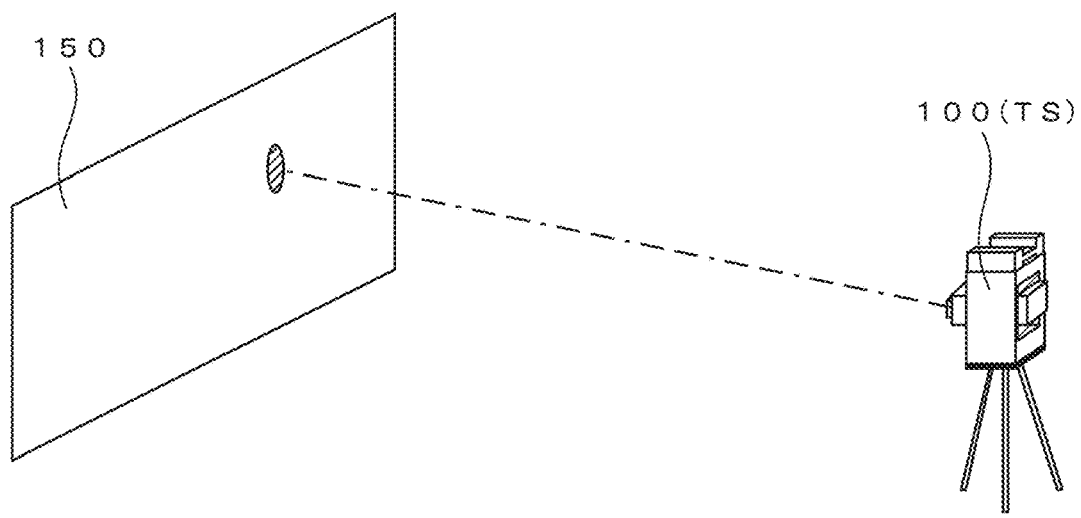

FIGS. 1A to 1C show an overview of an embodiment. The reference symbol 150 indicates an object to be inspected, which is, for example, a concrete wall surface. Examples of the object to be inspected include, but are not limited to, a wall, a building, a tunnel inner wall, a bridge pier, a road surface, a dam, other various types of wall surfaces and ceiling surfaces, and a slope, a cliff, and a bank that are reinforced with concrete. The material of the object to be inspected is not specifically limited, but examples of the material include concrete, mortar, metal, wood, resin, various types of ceramic materials, and composite materials thereof. The object to be inspected may be painted. In addition, soil, rock, and other objects can be a target object to be inspected. In one example, movement or deformation of the ground or movement of rocks, each of which may cause a rockfall or collapse, can be monitored by laser scanning.

FIG. 1A shows a situation in which laser scanning is performed on a concrete wall surface 150 by using a laser scanning function of a total station (TS) equipped with a laser scanner. This laser scanning is repeatedly performed at a regular time interval of, e.g., once a year or once every two years. Of course, the scanning time interval can be selected as desired and is not limited to an equal time interval.

Figure 6A:
FIGS. 6A and 6B are images showing examples of an abnormality.
Figure 6B:
Figure 7A:
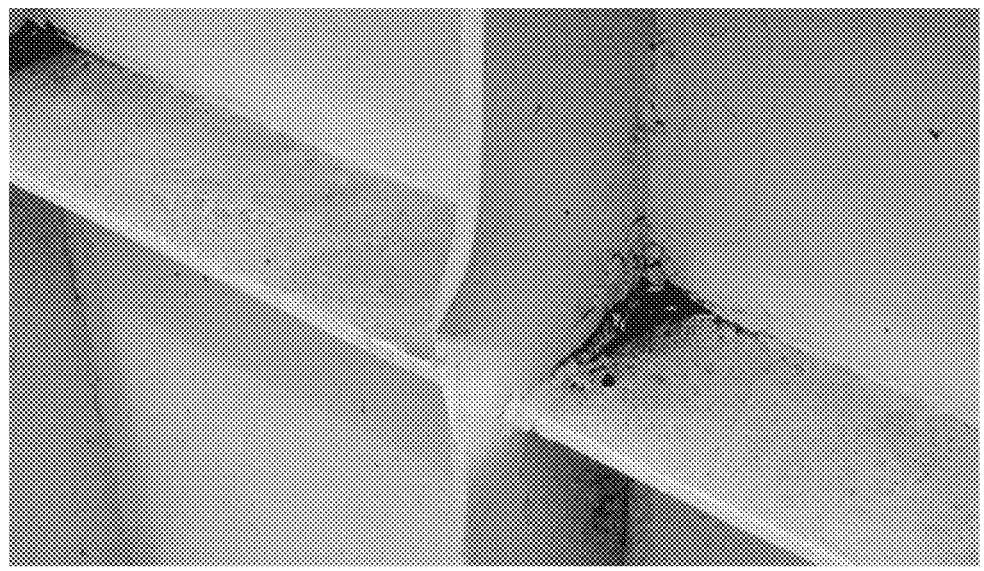
FIGS. 7A and 7B are images showing examples of an abnormality.
Figure 7B:
Figure 8A:
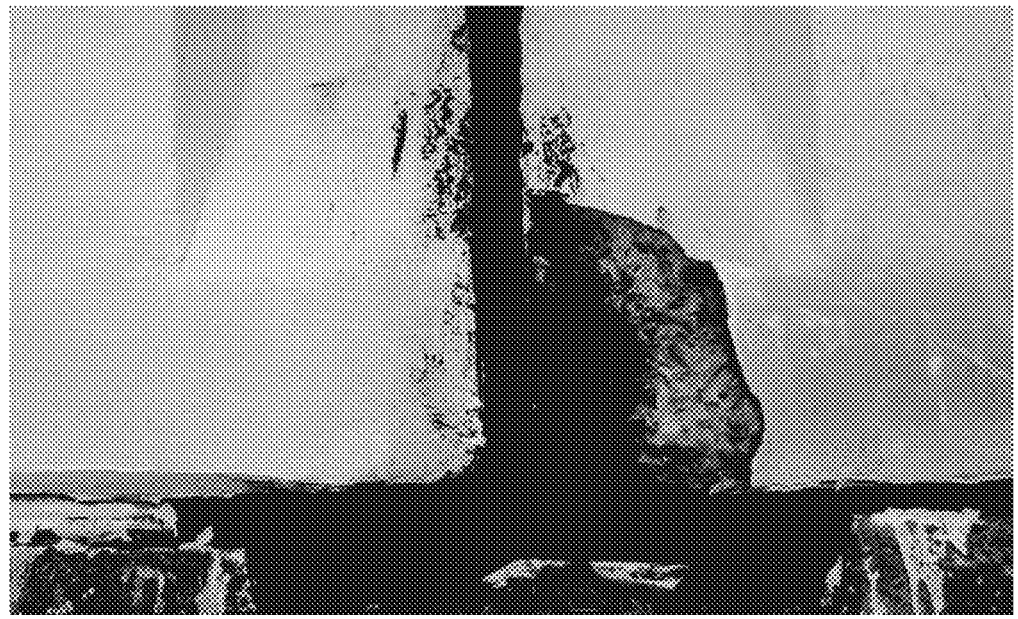
FIGS. 8A and 8B are images showing examples of an abnormality.
Figure 8B:
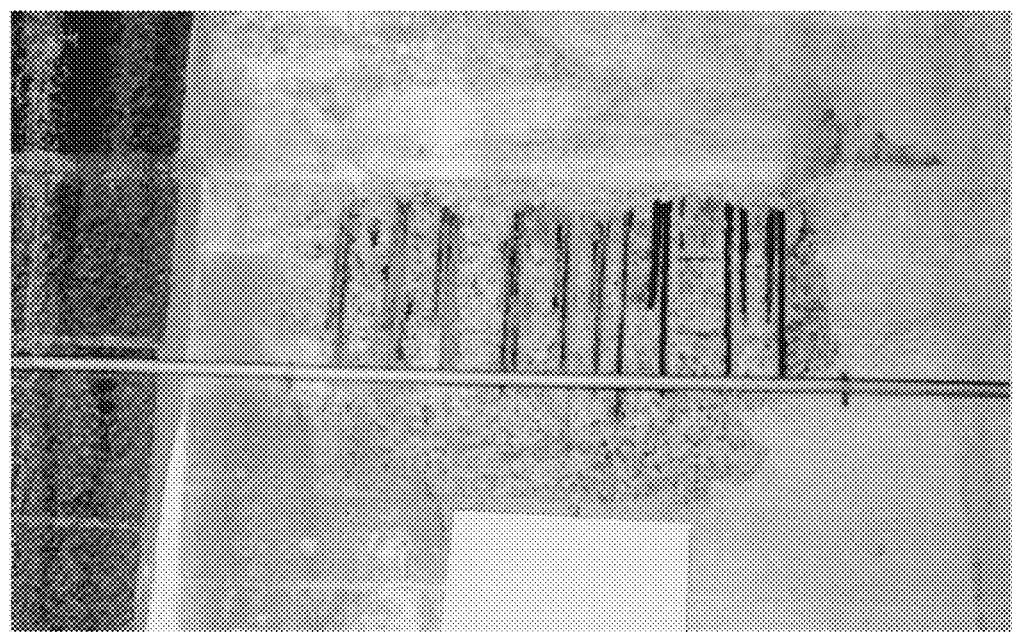

FIGS. 6A to 8B show specific examples of an abnormality. The images in FIG. 6A to 8B are cited from "Technical Notes of the National Institute for Land and Infrastructure Management No. 748" issued by the National Institute for Land and Infrastructure Management of the Ministry of Land, Infrastructure, Transport and Tourism (http://www.nilim.go.jp/lab/bcg/siryou/tnn/tnn0748.html). FIG. 6A shows a state in which a surface of concrete detached and floated. FIGS. 6B and 7A show states in which a steel frame was deformed. FIG. 7B shows an example of cracks generated in a concrete structural body. FIG. 8A shows a state in which a defect occurred in a concrete structural body covered with an iron plate. FIG. 8B shows a state in which a surface of reinforced concrete detached to expose a reinforcing bar.

FIG. 1B shows a state in which an abnormal part, for example, a defective part 151, was generated in the concrete wall surface 150 by corrosion or other causes. Herein, the concrete partially detached, leaving a concave part at the defective part 151.

In this state, three-dimensional position data of a laser scanned point, which is a point reflecting laser scanning light, at the concave part, differs from that in a case of having no concave part. The occurrence of the defective part 151 is detected by detecting this change in the position data of the point that reflects the laser scanning light.

Specifically, point cloud data that is obtained by laser scanning at the (N−1)th time and point cloud data that is obtained by laser scanning at the Nth time are compared with each other, and the difference is calculated. In the case in which an abnormality occurs during the period between the laser scanning performed twice at a time interval, the two sets of point cloud data differ from each other at the part having the abnormality. In view of this, the part at which the difference occurs is detected by using a threshold, as a part likely to have an abnormality, that is, a part needing detailed inspection. Note that "N" is a natural number of 2 or more.

The point cloud data that is obtained by laser scanning includes three-dimensional coordinates of each laser scanned point and intensity of light reflected at each laser scanned point. The position of a point that is obtained by laser scanning is expressed in a local coordinate system having an origin at an optical origin of the laser scanner that is used. In the condition in which exterior orientation parameters (position and attitude) in the absolute coordinate system of the laser scanner that is used are known, coordinates of a point in the absolute coordinate system can be obtained. The absolute coordinate system is a coordinate system used in a GNSS or a map, and the absolute coordinate system describes information of position in terms of, for example, latitude, longitude, and elevation.

The point cloud data that is obtained by laser scanning includes coordinates of each point that reflects scanning light, and therefore, the position of an abnormal part, which is obtained by the above method, can be known relative to the TS 100. That is, the position of the defective part 151, which occurs during the period between the laser scanning of the (N−1)th time and the laser scanning of the Nth time, can be known relative to the TS 100 from data of the difference between the point cloud data obtained by laser scanning of the (N−1)th time and the point cloud data obtained by laser scanning of the Nth time.

Specifically, position information, in terms of three-dimensional coordinates, of a point included in the point cloud data is compared between two sets of laser scanning data or two sets of point cloud data, and the difference is obtained. In the case in which a defect occurs during a period between a previous laser scanning and a current laser scanning, e.g., between laser scanning of the (N−1)th time and laser scanning of the Nth time, a difference is generated between point cloud position data of the laser scanning twice at the defective part. This difference emerges as the above-described difference. The degree of this difference is determined by using a threshold, and the part that provides the point cloud with this difference is detected as a defective part 151.

The TS 100 is an example of a total station equipped with a laser scanner. The TS 100 functions as a total station, and the TS 100 has observation and photographing functions by use of a telescope as well as a laser marking function. The optical axis of the telescope and the optical axis of laser marking light coincide with each other, whereby a telephotographic image of a position that is sighted by the TS 100 is obtained, and laser marking can be performed on the sighted position.

In this example, the defective part 151, in which the position is determined by laser scanning, is sighted by the telescope, and laser marking is performed thereon. Under these conditions, observation of an image of the defective part 151, inspector's visual inspection of the defective part 151 marked with laser marking light, and taking a photographic enlarged image of the defective part 151 using a UAV or the like, are performed.

Total Station Equipped with Laser Scanner

Figure 2:
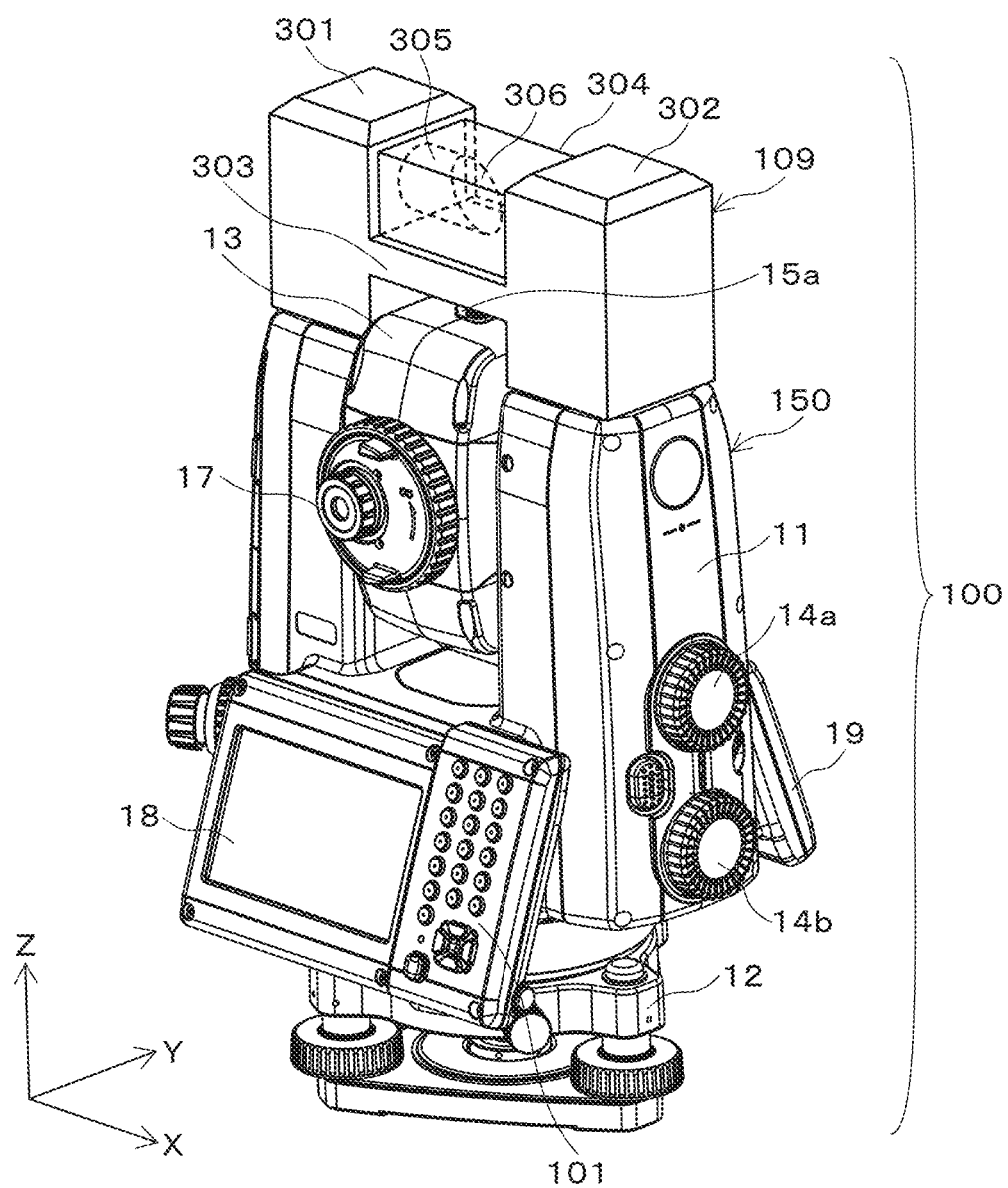
FIG. 2 shows an appearance of a total station equipped with a laser scanner used in embodiments of the present invention.
Figure 3:
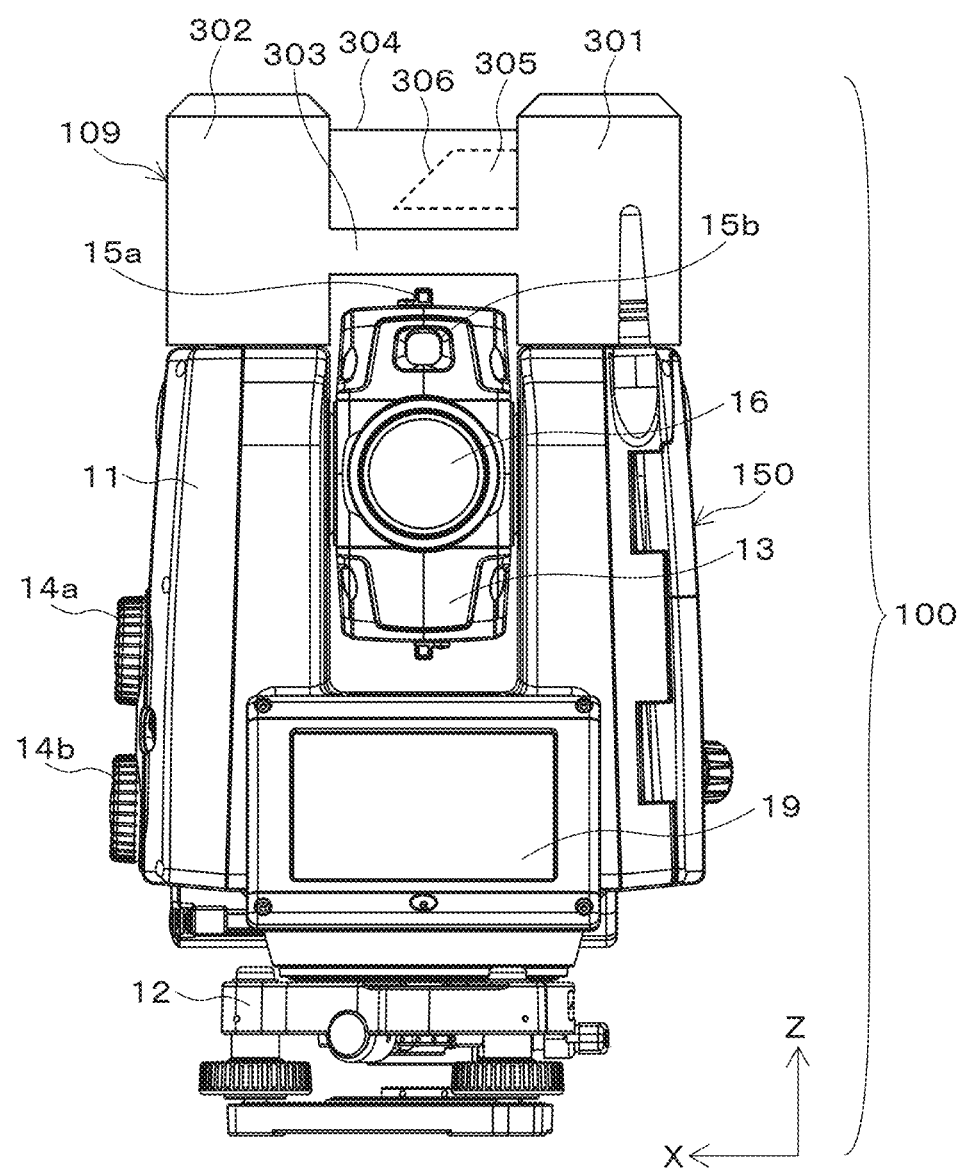
FIG. 3 shows an appearance of the total station equipped with the laser scanner used in the embodiments of the present invention.

FIG. 2 shows a perspective view of the total station (TS) 100 equipped with a laser scanner using the present invention. FIG. 3 shows a front view of the TS 100. The TS 100 has a combined structure of a TS and a laser scanner 109, which will be described later. The function of this TS is the same as that of an ordinary TS. Details of the structure of the TS are disclosed in, for example, Japanese Unexamined Patent Applications Laid-Open Nos. 2009-229192 and 2012-202821.

The TS 100 has a combined structure or a complex structure of a TS main body 150 and the laser scanner 109. The TS 100 includes a main unit 11. The main unit 11 is held on a base 12 in a horizontally rotatable state. The base 12 is fixed on a top of a tripod, which is not shown in the drawing. The main unit 11 has an approximately U shape and has two extending parts that upwardly extend as viewed from a Y-axis direction. A movable part 13 is held between the two extending parts so as to be controllable in a vertical angle, which includes an elevation angle and a depression angle.

The main unit 11 horizontally rotates relative to the base 12 by electrical operation. That is, the main unit 11 is driven by a motor for controlling a horizontal angle contained in the main unit 11, whereby the main unit 11 is horizontally rotated relative to the base 12. The movable part 13 vertically rotates relative to the main unit 11 by a motor for controlling a vertical angle contained in the main unit 11. The controls of these horizontal rotation and vertical rotation are performed by a vertical and horizontal rotation driving unit 106 contained in the main unit 11 (refer to the block diagram in FIG. 4).

The main unit 11 has a horizontal rotation angle controlling dial 14a and an elevation angle controlling dial 14b that are arranged thereon. The horizontal rotation angle controlling dial 14a is operated to adjust a horizontal rotation angle of the main unit 11 or the movable part 13. The elevation angle controlling dial 14b is operated to adjust a vertical angle of the movable part 13. It is also possible to input position data and to automatically direct the optical axis of the TS 100 to a direction contained in the input position data.

The movable part 13 has a rectangular cylindrical sighting unit 15a for approximate sighting, arranged on a top thereof. The movable part 13 also has an optical sighting unit 15b with a visual field narrower than that of the sighting unit 15a and has a telescope 16 that enables more precise sighting.

An image that is captured by the sighting unit 15b and the telescope 16 is visually recognized by looking into an eyepiece 17. The telescope 16 also serves as an optical system for the following light: distance measuring laser light in an infrared band, which is distance measuring light from a laser positioning unit 103, tracking light for tracking and capturing a target to which a distance is to be measured, for example, a dedicated reflection prism serving as a target, and laser marking light in a visible band for performing laser marking. The optical system is designed in such a manner that the optical axes of the distance measuring light, the tracking light, and the laser marking light coincide with the optical axis of the telescope 16.

The distance measuring laser light and the laser marking light may be implemented by one laser light. In this case, the laser light in the visible band is used as the distance measuring laser light and as the laser marking light. The relationships of exterior orientation parameters between the optical system of the movable part 13 and the laser scanner 109 are obtained in advance as design data and are known.

The main unit 11 has displays 18 and 19 mounted thereto. The display 18 is integrated with a controller 101. The controller 101 has a numeric keypad, a cross operation button, and other operation parts arranged thereon, which are used to perform various operations relating to the TS 100 and are used to input data. The displays 18 and 19 display surveying data, various information necessary to operate the TS 100, and other information. These two displays are mounted in order to enable viewing the display from either a front side or a back side without having to rotate the main unit 11.

The laser scanner 109 is fixed on a top of the main unit 11. The laser scanner 109 has a first column 301 and a second column 302. The first column 301 and the second column 302 are connected by a connecting part 303. The space above the connecting part 303 between the first column 301 and the second column 302 is covered with a protective case 304. The protective case 304 is made of a member that transmits the scanning laser light. The protective case 304 houses a rotating part 305 that protrudes from the first column 301 in an X-axis direction. A tip of the rotating part 305 is obliquely cut off, and this tip has a tilt mirror 306 fixed thereon.

The rotating part 305 is driven to be rotated around an X-axis by a motor contained in the first column 301. The first column 301 contains, in addition to the motor, a driving circuit for driving the motor, a control circuit for the driving circuit, a sensor for measuring a rotation angle of the rotating part 305, and a peripheral circuit of the sensor.

The second column 302 contains a light emitting part for emitting laser scanning light, a light receiving part that receives the laser scanning light reflected back from a target object, an optical system relating to the light emitting part and the light receiving part, and a distance calculator that calculates a distance to a laser scanned point or a point reflecting the scanning light. The laser scanner 109 also includes a scanned point position calculator that calculates three-dimensional coordinates of the scanned point based on a rotation angle, or more precisely, a vertical rotation angle, of the rotating part 305, a horizontal rotation angle of the main unit 11, and a distance to the scanned point.

The relationships of exterior orientation parameters between the optical system of the laser scanner 109 and the optical system inside the movable part 13, which is an optical system of the laser positioning unit 103, are known as design data. That is, the position relationship of the optical origin between the laser scanner 109 and the laser positioning unit 103 is known, and the relationship of attitude between the laser scanner 109 and the laser positioning unit 103 is also known.

The laser scanning light is emitted from the inside of the second column 302 to the tilt mirror 306 and is reflected thereat to exit to the outside via the transparent protective case 304. The scanning light that is reflected back from a target object reverses the path of the emitted light and is received by the light receiving part in the second column 302.

The scanned point, which is a point reflecting the scanning laser light, is positioned by referring to light emission timing and light reception timing of the scanning light as well as the vertical rotation angle of the rotating part 305 and the horizontal rotation angle of the main unit 11 at each of these timings. The principle of this positioning is the same as that for normal laser distance measurement.

The principle of the laser distance measurement of the laser scanner 109 will be briefly described hereinafter. Basically, light velocity is constant. Thus, in the condition that a flight time and a direction of distance measuring light are determined, a vector starting from an optical origin of an optical system is set, and a position of a point reflecting the distance measuring light relative to the optical origin is calculated. This principle also applies to laser positioning of the laser positioning unit 103.

The flight time of the distance measuring light is known from a difference between light emission timing and light reception timing, or a difference in light reception timing or a phase difference between the distance measuring light and reference light that has propagated through a reference optical path having a known distance.

The emission direction of the distance measuring light is known from the vertical rotation angle of the rotating part 305 and the horizontal rotation angle of the main unit 11 at the time of light emission. The vertical rotation angle of the rotating part 305 and the horizontal rotation angle of the main unit 11 are measured by the vertical and horizontal rotation angle measuring unit 107.

Pulsed laser light for laser scanning is emitted in a pulsed manner, reflected at the tilt mirror 306, and is then emitted intermittently to the outside from the protective case 304. At this time, the laser scanning light is emitted while the rotating part 305 rotates. As a result, laser scanning in a vertical plane, which is a Y-Z plane around the X-axis, that is, laser scanning along the vertical plane is performed. Simultaneously, laser scanning in the horizontal direction is also performed by horizontally rotating the main unit 11 around a Z-axis. Thus, laser scanning is performed on the entire circumference or a necessary region. The laser scanning light may be emitted once in order to use one beam or may be emitted multiple times at a time in order to use multiple beams.

The technique relating to the laser scanner is disclosed in Japanese Unexamined Patent Applications Laid-Open Nos. 2010-151682 and 2008-268004, U.S. Pat. Nos. 8,767,190 and 7,969,558, U.S. Patent Application Publication No. 2017/0269197, etc. A laser scanner that electronically scans, as disclosed in U.S. Patent Application Publication No. 2015/0293224, can also be employed as the laser scanner.

Block Diagram

Figure 4:
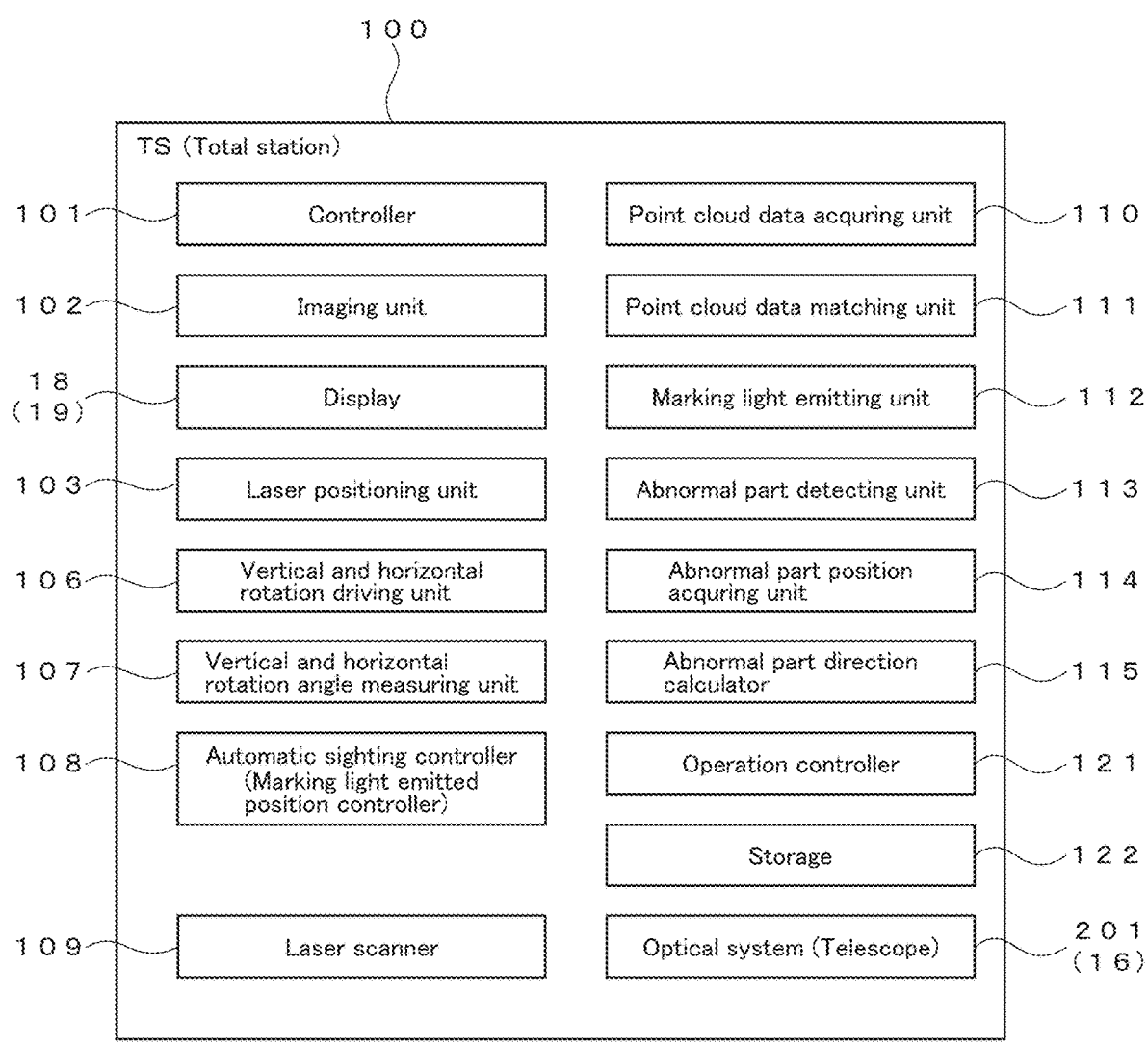
FIG. 4 is a block diagram of the total station equipped with the laser scanner used in the embodiments of the present invention.

FIG. 4 shows a block diagram of the total station (TS) 100. The basic functions of the TS 100 as a total station are the same as an existing one. The TS 100 differs from an existing total station in that the TS 100 is combined with the laser scanner 109, an abnormal part is detected by laser scanning, and moreover, laser marking light is emitted.

The TS 100 includes the controller 101, an imaging unit or camera 102, the displays 18 and 19, the laser positioning unit 103, the vertical and horizontal rotation driving unit 106, the vertical and horizontal rotation angle measuring unit 107, an automatic sighting controller or marking light emitted position controller 108, the laser scanner 109, a point cloud data acquiring unit 110, a point cloud data matching unit 111, a marking light emitting unit 112, an abnormal part detecting unit 113, an abnormal part position acquiring unit 114, an abnormal part direction calculator 115, an operation controller 121, a storage 122, and an optical system 201 or a telescope 16.

The laser positioning unit 103 performs three-dimensional positioning using laser light, which is a basic function of a TS. The principle of positioning is the same as that of the laser scanner 109. The optical system 201 includes the sighting unit 15b (refer to FIG. 3), the telescope 16 (refer to FIG. 3), the optical system of the laser positioning unit 103, an optical system of the imaging unit 102, an optical system constituting an optical path for the tracking light, which is not shown, and an optical system constituting an optical path for marking light that is emitted from the marking light emitting unit 112. The distance measuring light from the laser positioning unit 103 and the marking light from the marking light emitting unit 112 are emitted on the optical axis of the telescope 16 from an objective lens of the telescope 16.

The optical system 201 includes various types of lenses, a mirror, a dichroic mirror for separating an optical path or combining optical paths, a half mirror, a polarizing mirror, and other components. With use of the optical system 201, the distance measuring laser light is emitted to a target object to be positioned, via the telescope 16, and the distance measuring laser light that is reflected back from the target object to be positioned, is received via the telescope 16. The optical system 201 leads an image that is captured by the telescope 16, to the eyepiece 17 and to the imaging unit 102. The marking light that is emitted from the marking light emitting unit 112 is emitted to a position to be marked, via the optical system 201.

The TS 100 also includes a tracking-light emitting unit, a tracking-light receiving unit, and a tracking controller. The tracking-light emitting unit emits tracking light for tracking a target, for example, a reflection prism. The tracking-light receiving unit receives the tracking light that is reflected back from the target. The tracking controller outputs a control signal to the vertical and horizontal rotation driving unit 106 so that the tracking light will come to a sighting position in a visual field of the telescope 16. These components are the same as those of a product that is currently supplied in the market, and therefore, detailed description thereof are omitted. The configuration relating to the tracking light of the TS is disclosed in, for example, Japanese Patent No. 5124319.

The controller 101 receives a content of operation performed at the TS 100 by an operator. This operation includes operation relating to laser scanning using the laser scanner 109, detection of an abnormal part of an object to be inspected by means of the laser scanner 109, and operation relating to emission of the marking light to the detected abnormal part. The operation of the TS 100 is performed by use of a button switch or the like, which is provided to the TS 100. A tablet or a smart phone may also be used as a controller. In this case, dedicated application software is installed in a tablet or a smart phone to make the tablet or the smart phone function as a control means of the TS 100.

The imaging unit 102 images an image that is captured by the telescope 16. The imaging is performed by, for example, a CCD image sensor or a CMOS image sensor. The displays 18 and 19 show an image taken by the imaging unit 102, information necessary to operate the TS 100, information relating to movement of the TS 100, such as distance measuring data and an azimuth of a target, and other information. Each of the displays 18 and 19 uses, e.g., a liquid crystal display or an EL display.

The vertical and horizontal rotation driving unit 106 drives to horizontally rotate the main unit 11 and drives to vertically rotate the movable part 13. The vertical and horizontal rotation driving unit 106 includes a motor, a gear mechanism, and a driving circuit, for performing the driving.

The vertical and horizontal rotation angle measuring unit 107 measures a horizontal rotation angle of the main unit 11 and measures a vertical angle in terms of an elevation angle or a depression angle of the movable part 13. The angle is measured by using a rotary encoder. The horizontal rotation angle is measured, for example, in a clockwise direction starting from the direction of north as 0 degrees as viewed from above. The vertical angle in terms of an elevation angle or a depression angle is measured on the condition that an elevation direction is positive and a depression direction is negative, starting from the horizontal direction as 0 degrees.

The automatic sighting controller or marking light emitted position controller 108 performs controlling or sighting control to direct the optical axis of the telescope 16 to an abnormal part, on the basis of a position of the abnormal part relative to the TS 100, which is acquired by the abnormal part position acquiring unit 114. The optical axis of the telescope 16 coincides with the optical axis of the distance measuring laser light from the laser positioning unit 103 and the optical axis of the marking light from the marking light emitting unit 112. Thus, adjustment of an emission direction or emitted position of the distance measuring laser light from the laser positioning unit 103 and adjustment of an emission direction or emitted position of the marking light from the marking light emitting unit 112 are performed at the same time by sighting the telescope 16.

Specifically, a control signal for determining the direction of the optical axis of the telescope 16 is generated by the marking light emitted position controller 108 and is sent to the vertical and horizontal rotation driving unit 106, whereby the horizontal angle position of the main unit 11 and the vertical rotation angle of the movable part 13 are adjusted.

The laser scanner 109 performs laser scanning to obtain point cloud data or a laser scanned point cloud. The region of the laser scanning can be set as desired.

The point cloud data acquiring unit 110 acquires the point cloud data obtained by the laser scanner 109. In this example, the point cloud data obtained by the laser scanner 109 is stored in the storage 122. This data is read from the storage 122 and is acquired by the point cloud data acquiring unit 110 in processing for detecting an abnormal part. The scanning data, which is the point cloud data obtained by laser scanning, may be stored in an appropriate storage medium or a storage device and may be acquired therefrom.

The point cloud data matching unit 111 calculates a correspondence relationship between two sets of point cloud data. For example, it is assumed that laser scanning using the TS 100 is performed on a specific target object multiple times at a time interval. In one example of this case, a correspondence relationship between point cloud data of laser scanning of the (N−1)th time and point cloud data of laser scanning of the Nth time is determined, that is, matching therebetween is performed. The matching method employs, for example, template matching. The algorithm for matching sets of point cloud data has been variously developed. The matching of sets of point cloud data is disclosed in, for example, WO 2012/141235, Japanese Unexamined Patent Applications Laid-Open Nos. 2014-35702, 2015-46128, and 2017-15598. The time interval on the time axis of sets of point cloud data to be compared with each other is not limited. In another example, it is also possible to determine a correspondence relationship between point cloud data of laser scanning of the Nth time and point cloud data of laser scanning of the (N+3)th time.

The marking light emitting unit 112 emits laser light for marking, that is, laser marking light. The laser marking light is visible light and marks using a bright spot of an irradiated point.

The abnormal part detecting unit 113 detects an abnormal part of the target object based on the comparison of the sets of the laser scanning data or the sets of the laser scanning point clouds with respect to the same target object, which are obtained at a time interval. Specifically, pieces of position information of the sets of the laser scanning data are compared with each other, and the difference is calculated. In a case in which a defect or deformation occurs, point cloud position information at the part having the defect or the deformation varies. This variation is acquired as difference data of the two sets of the laser scanning point clouds. Then, in the case of detecting a difference exceeding a predetermined threshold, it is determined that an abnormality seems to have occurred at the point that generates this difference. This process is performed by the abnormal part detecting unit 113.

The abnormal part position acquiring unit 114 acquires a position of the abnormal part detected by the abnormal part detecting unit 113. The abnormal part is acquired by calculating the difference in position data between two sets of point cloud data. Thus, the position of the abnormal part is known by referring to the position data of the point cloud data relating to this difference.

The abnormal part direction calculator 115 calculates a direction of the abnormal part as viewed from the TS 100, on the basis of the position information acquired by the abnormal part position acquiring unit 114. In the condition in which the position of the abnormal part relative to the TS 100 is known, the direction of the abnormal part as viewed from the TS 100 is also known. This process is performed by the abnormal part direction calculator 115.

Figure 5:
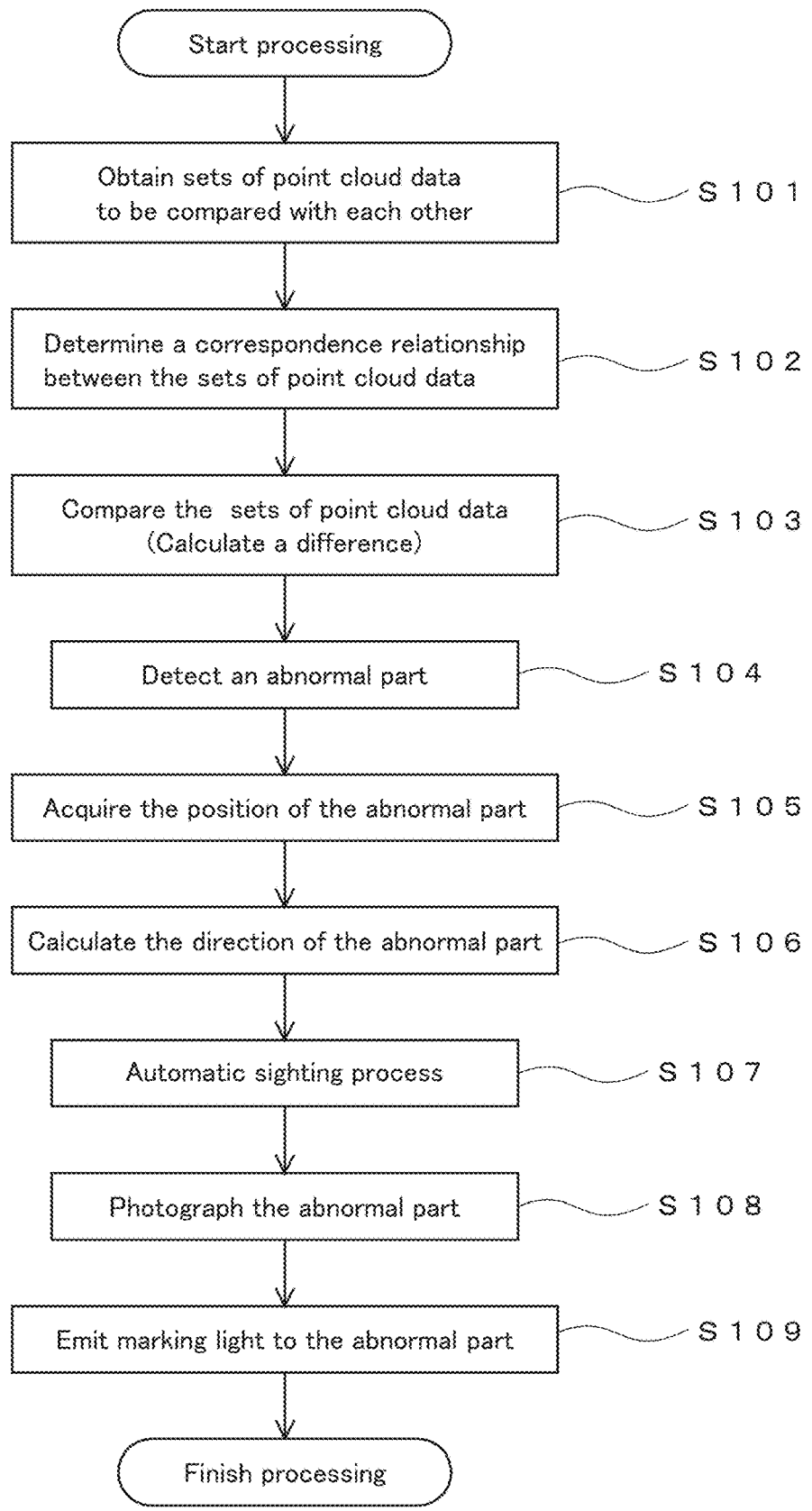
FIG. 5 is a flowchart showing an example of a processing procedure.

The operation controller 121 generally controls operations of the TS 100. For example, processes relating to processing in FIG. 5 are controlled by the operation controller 121. The storage 122 stores data and a program necessary to operate the TS 100 and stores surveying data acquired as a result of the operation of the TS 100.

Example of Processing

FIG. 5 is a flowchart showing an example of a processing procedure relating to detection of an abnormal part of an object to be inspected, which is performed by using the TS 100. The program for executing the processing unit in FIG. 5 is stored in the storage 122 or an appropriate storage medium. This processing procedure is controlled and executed by the operation controller 121. It is also possible to store this program in an appropriate storage medium or a storage device accessible via a communication line, such as a data server, and to download it therefrom. The processing in FIG. 5 may be executed by a personal computer (PC), a server, or other device.

Herein, it is assumed that an object to be inspected is a cliff or slope that is reinforced with concrete. It is also assumed that exterior orientation parameters in terms of an absolute coordinate system of the TS 100 to be used are obtained and are known before laser scanning is performed.

First, laser scanning on the object to be inspected is performed at a time interval by using the TS 100. For example, laser scanning is performed on the object to be inspected every three months or every half a year by using the TS 100, whereby point cloud data is periodically obtained. The location of the laser scanner at each time of the laser scanning may be the same or may not be the same.

The following describes processing relating to detection of an abnormal part that occurred during a period between times $T_1$ and $T_2$ and to guidance to the abnormal part, on the basis of point cloud data 1 obtained by laser scanning of the (N−1)th time performed at the time $T_1$ and point cloud data 2 obtained by laser scanning of the Nth time performed at the time $T_2$ posterior to the time $T_1$. Note that "N" is a natural number of 2 or more.

First, point cloud data 1 and point cloud data 2 are obtained (step S101). This process is performed by the point cloud data acquiring unit 110. Next, a correspondence relationship between the point cloud data 1 and the point cloud data 2 is determined, that is, matching therebetween is performed (step S102). This process is performed by the point cloud data matching unit 111.

Then, the point cloud data 1 and the point cloud data 2 are compared with each other to calculate the difference in position data of each point (step S103). On the basis of this difference data acquired in step S103, an abnormal part, or more precisely, a part suspected of having an abnormality, is detected (step S104). These processes in steps S103 and S104 are performed by the abnormal part detecting unit 113. The processing finishes if no abnormal part is detected.

In the case in which an abnormal part is detected, the position of the abnormal part is acquired (step S105). This process acquires the position of the abnormal part from the point cloud data of the abnormal part. This process is performed by the abnormal part position acquiring unit 114. After the position of the abnormal part is acquired, the direction of the abnormal part as viewed from the TS 100 is calculated (step S106). This process is performed by the abnormal part direction calculator 115.

After the direction of the abnormal part is calculated, an automatic sighting process is performed to make the telescope 16 sight this direction (step S107). In this process, a control signal is generated by the automatic sighting controller or marking light emitted position controller 108, and this control signal makes the vertical and horizontal rotation driving unit 106 adjust the angle position in the vertical direction of the movable part 13 and also adjust the angle position in the horizontal direction of the main unit 11. After collimation of the telescope 16 is performed, the abnormal part is photographed by the imaging unit 102 (step S108).

Next, marking light is emitted from the marking light emitting unit 112 (step S109). This process causes emission of the marking light to the abnormal part, which is detected by laser scanning. With use of the mark marked by the marking light, the abnormal part is visually recognized or the abnormal part is photographed by using a UAV. The photographing and the marking are performed by using the automatic sighting, whereby work relating to detection of the abnormal part of the target object by means of laser scanning are efficiently performed.

Other Matters

The times of obtaining sets of point cloud data to be compared with each other are freely combined. In one example, laser scanning may be performed every half a year. In this case, it is possible to compare current point cloud data and point cloud data that is obtained the previous year, with each other, or compare current point cloud data and point cloud data that is obtained two years before, with each other. These sets of point cloud data are obtained by laser scanning.

The time interval for obtaining point clouds to be used can be freely determined depending on the kind of target to be inspected. For example, although the time interval may be every several months or every year in the case of inspecting an abnormality in a concrete wall surface, as in the example described above, an abnormality may be monitored at a time interval of several hours, depending on the target.

The light emitting part for the marking light may not be coaxial with the telescope 16, but may be disposed separately from the telescope 16 of the movable part 13. In this case, a sighted point of the telescope 16 may deviate from a position marked by the marking light.

2. Second Embodiment

The progress of an abnormality may be slow in consideration of the time interval of the laser scanning. In this case, an abnormality may not be detected by comparison between data of laser scanning of the (N−1)th time and data of laser scanning of the Nth time, but it may be possible to detect an abnormality by comparison between data of laser scanning of the (N−2)th time and data of laser scanning of the Nth time. As a method for corresponding to such a case, comparison between data of laser scanning of the (N−1)th time and data of laser scanning of the Nth time, comparison between data of laser scanning of the (N−2)th time and the data of laser scanning of the Nth time, comparison between data of laser scanning of the (N−3)th time and the data of laser scanning of the Nth time, and . . . , may be performed to detect progress of an abnormality.

3. Third Embodiment

In this embodiment, data for inspecting details of the abnormal part that is detected in step S104 is acquired by using a positioning function that is provided to the total station 100 as an original function of the TS. The following describes an example. First, it is assumed that a part suspected of having an abnormality is detected in step S104 in FIG. 5. In this case, matrix points of, e.g., 9×9 points or 15×15 points, centering at the detected part, are set, and positioning is performed on these matrix points by using the function of the laser positioning unit 103.

The interval of the points is selected from among multiple patterns of the interval of the points, which are preliminarily prepared. In one example, matrix patterns such as mesh intervals of 5 cm, 10 cm, and 20 cm are prepared in advance as point cloud densities, and the interval of the points is selected therefrom.

The point cloud data is obtained by the laser positioning unit 103 in such a manner that (1) the optical axis of the telescope 16 is set by horizontal rotation of the main unit 11 and vertical rotation of the movable part 13 and (2) laser positioning is performed multiple times, with respect to one measurement point. This method requires a measurement time longer than that in the case of using the laser scanner 109, but enables highly accurate positioning.

After the point cloud data is obtained by the laser positioning unit 103, this point cloud data is analyzed to determine the condition of an abnormality. For example, slight deformation of a target object can be evaluated by comparing design data or three-dimensional model data that is acquired in advance and the point cloud data that is obtained by using the laser positioning unit 103.

The total station (TS) and the laser scanner have the same function in performing laser positioning. However, the positioning accuracy of the TS is higher than that of the laser scanner. This is due to the following reason.

First, in obtaining point cloud data using the laser positioning unit 103 of the TS 100, laser positioning is performed in the state in which the main unit 11 and the movable part 13 are stopped still. In positioning using the laser positioning unit 103, the positioning laser light is emitted to one point multiple times, for example, 3 to 15 times, to perform positioning multiple times, and an average of the positioning results is used as positioning data.

On the other hand, in laser scanning using the laser scanner 109, the emission direction varies in relation to emission of the positioning laser light while the positioning laser light is swept, and therefore, the positioning laser light is difficult to emit to one point multiple times. As a result, positioning accuracy of each point that constitutes the point cloud data is lower than that in the case of using the laser positioning unit 103.

In this embodiment, precise positioning is performed on a part at which occurrence of an abnormality is predicted, that is, a part that is suspected of having an abnormality, as a result of the laser scanning. This method is effective in, e.g., detecting an abnormality at a place that is difficult to visually recognize, or detecting an abnormality that is difficult to determine by visual recognition or image observation. Combining the laser scanning function of the laser scanner and the precise positioning function of the TS enables increasing efficiency of the work relating to detection of an abnormal part of a target object by means of laser scanning.

4. Fourth Embodiment

It is also possible to learn the pattern types of point cloud data at an abnormal part by machine learning in advance and to determine which of the pattern types the obtained point cloud of the abnormal part corresponds to. In this case, the pattern type is determined from a difference between first point cloud data and second point cloud data that are obtained at a time interval.

For example, variations in point cloud data that characterize a crack are examined in advance as a pattern type by using a machine learning technique. Then, when variations in point cloud data that represent the feature of the crack are detected, the part that provides these variations is extracted as a part at which the crack occurred. In a similar manner, a pattern type of abnormality, such as falling off, or exposure of a reinforcing bar, is determined.

The determined pattern type is presented to a user. The result of the determination is associated with the point cloud data, a photographic image, and other information, each of which relates to the corresponding abnormal part, and they are stored as data. Of course, the contents of data can be altered or modified.

The pattern types of abnormality include floating, defects, falling off, cracks, embrittlement, and expansion of concrete, exposure of a reinforcing bar, and deformation such as buckling of a steel frame. In this embodiment, a suspectable pattern type is determined as reference information, and this result is presented to a user or is stored. It is also possible to determine a pattern type of multiple abnormalities. For example, a condition of having both deformation and cracking can be determined.

It is also possible to determine post processing in accordance with the determined pattern type of abnormality. In this case, for example, the marking light is emitted in a case of peeling off, an enlarged photographic image is obtained in a case of a crack, and a laser scanning point cloud is obtained again by increasing the density of laser scanned points or laser scanning data is obtained with high accuracy by using the total station in a case of deformation.

What is claimed is:

1. A surveying method for detecting an abnormal part of a target object by using a surveying apparatus that has a combined structure of a total station and a laser scanner, relationships of exterior orientation parameters between the total station and the laser scanner being known in advance, the surveying method comprising:
 a step of acquiring first point cloud data and second point cloud data that are obtained by laser scanning, the laser scanning being performed on the target object multiple times at a time interval by the laser scanner;
 a step of calculating a difference in position information between the first point cloud data and the second point cloud data to detect a part of the target object, at which the position information varies between a first time the first point cloud data is obtained and a second time the second point cloud data is obtained, as a detailed-inspection target part;
 a step of acquiring a position of the detailed-inspection target part; and
 a step of performing control for sighting by rotating the total station toward the detailed-inspection target part, to make the total station sight the detailed-inspection target part, on a basis of the position of the detailed-inspection target part,
 wherein the laser scanning is performed by emitting positioning laser light while sweeping the positioning laser light,
 the total station performs positioning on multiple points at the detailed-inspection target part in such a manner that:
  positioning is performed by emitting the positioning laser light to one of the multiple points, multiple times;
  an average of results of the positioning that is performed multiple times is used as positioning data; and
  the positioning is repeated until all of the multiple points are positioned, whereby multiple pieces of the positioning data are obtained, and
  the multiple pieces of the positioning data are used to detect the abnormal part that occurs between the first time the first point cloud data is obtained and the second time the second point cloud data is obtained.

2. The surveying method according to claim 1, further comprising a step of obtaining an image captured by a telescope that is provided to the total station,
 wherein the control for sighting makes the telescope sight the detailed-inspection target part, and an enlarged image of the detailed-inspection target part is captured by the telescope.

3. The surveying method according to claim 1, wherein the total station has a function of emitting marking light, and
 the surveying method further comprises a step of emitting the marking light to the detailed-inspection target part after the control for sighting is performed.

4. The surveying method according to claim 1, wherein a pattern type of abnormality is determined on a basis of the difference between the first point cloud data and the second point cloud data.

5. The surveying method according to claim 4, wherein post processing is determined in accordance with the determined pattern type of abnormality.

* * * * *